US008006179B2

(12) United States Patent (10) Patent No.: US 8,006,179 B2
Hoyer et al. (45) Date of Patent: Aug. 23, 2011

(54) WRAPPING NODES IN A DRAWING CANVAS

(75) Inventors: Crystal L. Hoyer, Redmond, WA (US);
Anna Dayen, Redmond, WA (US);
David M. Gerton, Seattle, WA (US);
Janet L. Schorr, Seattle, WA (US);
Scott A. Sherman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1323 days.

(21) Appl. No.: 11/496,521

(22) Filed: Jul. 31, 2006

(65) Prior Publication Data

US 2008/0028299 A1    Jan. 31, 2008

(51) Int. Cl.
 *G06F 17/00* (2006.01)
(52) U.S. Cl. ........................ 715/247; 715/255
(58) Field of Classification Search .................. 715/243, 715/252, 254–255, 200, 247
See application file for complete search history.

(56) References Cited

U.S. PATENT DOCUMENTS

| | | | | |
|---|---|---|---|---|
| 4,974,194 | A | 11/1990 | Barker et al. | 715/201 |
| 5,555,362 | A | 9/1996 | Yamashita et al. | 715/209 |
| 5,950,215 | A | 9/1999 | Tabuchi | 715/200 |
| 6,208,955 | B1 | 3/2001 | Provan et al. | 703/20 |
| 6,414,698 | B1 | 7/2002 | Lovell et al. | 715/800 |
| 6,502,114 | B1 * | 12/2002 | Forcier | 715/273 |
| 6,667,750 | B1 | 12/2003 | Halstead, Jr. et al. | 715/788 |
| 6,792,448 | B1 | 9/2004 | Smith | 710/100 |
| 6,826,727 | B1 | 11/2004 | Mohr et al. | 715/235 |
| 6,976,214 | B1 | 12/2005 | Bates et al. | 715/236 |
| 6,978,422 | B1 | 12/2005 | Bushe et al. | 715/734 |
| 7,010,746 | B2 | 3/2006 | Purvis | 715/249 |
| 7,743,079 | B1 | 6/2010 | Hoyer et al. | 707/821 |
| 2002/0111969 | A1 | 8/2002 | Halstead, Jr. | 715/243 |
| 2003/0076350 | A1 | 4/2003 | Vu | 345/738 |
| 2003/0105589 | A1 | 6/2003 | Liu et al. | 702/1 |
| 2003/0126136 | A1 | 7/2003 | Omoigui | 707/10 |
| 2004/0172594 | A1 | 9/2004 | Jones et al. | 715/230 |
| 2004/0181543 | A1 | 9/2004 | Wu et al. | 707/102 |

(Continued)

FOREIGN PATENT DOCUMENTS

EP        0 364 189        4/1990

(Continued)

OTHER PUBLICATIONS

U.S. Final Office Action dated Nov. 28, 2008 cited in U.S. Appl. No. 11/496,281.

(Continued)

*Primary Examiner* — Stephen S Hong
*Assistant Examiner* — Manglesh M Patel
(74) *Attorney, Agent, or Firm* — Merchant & Gould (57) ABSTRACT

Wrapping nodes in a drawing canvas may be provided. A plurality of nodes may be received and a location to wrap the plurality of nodes may be determined. The location may be between two consecutive nodes in the plurality of nodes. Furthermore, a direction may be determined to place a first subset of the plurality of nodes comprising at least one node in the plurality of nodes and being subsequent to the determined location. The plurality of nodes may be balanced using at least one of the following: i) placing nodes within the plurality of nodes to an end of available space within the drawing canvas; ii) placing a first predetermined number of nodes of the plurality of nodes per row; and iii) evenly spacing a second predetermined number of nodes of the plurality of nodes.

20 Claims, 7 Drawing Sheets

U.S. PATENT DOCUMENTS

| | | | |
|---|---|---|---|
| 2005/0005239 A1 | 1/2005 | Richards | 715/210 |
| 2005/0005249 A1 | 1/2005 | Hill et al. | 715/810 |
| 2005/0050477 A1 | 3/2005 | Robertson et al. | 715/853 |
| 2005/0052405 A1 | 3/2005 | Maulik et al. | 345/156 |
| 2005/0057576 A1 | 3/2005 | Shen et al. | 345/619 |
| 2005/0286065 A1* | 12/2005 | Gauthier et al. | 358/1.13 |
| 2006/0066632 A1 | 3/2006 | Wong et al. | 345/619 |
| 2010/0275156 A1 | 10/2010 | Hoyer et al. | 715/803 |

FOREIGN PATENT DOCUMENTS

| | | |
|---|---|---|
| WO | WO9428480 | 12/1994 |

OTHER PUBLICATIONS

U.S. Office Action dated Jul. 22, 2009 cited in U.S. Appl. No. 11/496,281.

Copending U.S. Appl. No. 12/781,843, filed May 18, 2010 entitled "Managing Data Across a Semantic Data View and a Presentation Data View".

U.S. Office Action dated Nov. 29, 2010 cited in U.S. Appl. No. 12/781,843.

Greg Ross, "Hybrid Information Visualisation Environment," http://www.dcs.gla.ac.uk/~gr/hive.htm, Aug. 3, 2006.

Toshiyuki Masui, "Graphic Object Layout with Interactive Genetic Algorithms," pp. 74-80, 1992, IEEE.

Oreas—Automatic Diagram Layouts, http://www.oreas.de/layouts_en.php, 3 pages, Sep. 3, 2006.

Christian Seybold et al., "An Effective Layout Adaptation Technique for a Graphical Modeling Tool," Proceedings of the 2003 International Conference on Software Engineering, Portland, pp. 826-827.

Copending U.S. Appl. No. 11/496,281, filed Jul. 31, 2006 entitled "Managing Data Across a Semantic Data View and a Presentation Data View".

Robert C. Miller et al., "LAPIS: Smart Editing with Text Structure," Demonstrations, CHI 2002: changing the world, changing ourselves, Minneapolis, MN, Apr. 20-25, 2002, pp. 496-497.

Robert C. Miller et al., "Multiple Selections in Smart Text Editing," pp. 103-110, Jan 13-16, 2002.

On the Web sun.com/aboutsun/comm._invest, Staroffice 8 Impress, 2005, Sun Microsystems, Inc., pp. 1-20.

U.S. Office Action dated Jun. 11, 2008 cited in U.S. Appl. No. 11/496,281.

U.S. Final Office Action dated May 11, 2011 cited in U.S. Appl. No. 12/781,843.

* cited by examiner

WRAPPING NODES IN A DRAWING CANVAS

Related U.S. patent application Ser. No. 11/496,281, filed on even date herewith, entitled "Managing Data Across a Semantic Data View and a Presentation Data View," assigned to the assignee of the present application, is hereby incorporated by reference.

BACKGROUND

Visual aids help people understand information. Conveying information to or among groups of people may require creating visual presentations embodying the information. Graphics application programs, such as the Microsoft® PowerPoint® presentation application, have helped automate creating such visual presentations. Such graphics application programs allow users to convey information more efficiently and effectively by putting that information in an easily understandable format.

A graphic is a visual idea representation, such as a diagram or other drawing. A graphic is typically composed of several graphical elements (e.g., nodes shown in a drawing canvas) that represent content embodying an idea, such as, for example, a bulleted list (e.g. shown in a text pane). Each graphical element is a part of the displayed graphic. A graphical element can have both textual characteristics and graphical characteristics. Graphical characteristics generally refer to pictorial or other graphical element visual features. Textual characteristics generally refer to the written matter within the graphical element. Depending on the information and the audience, a graphics application program user generally determines a specific graphic that will best teach or convey underlying information.

In some situations, conventional algorithms only allow users to place elements on a single row. Consequently, if the user wants multiple lines of elements, the user would need to create multiple instances of a single row graphic and append them together. Thus, with the conventional strategy, if any new elements are added, all the different instances need to be updated so they balance appropriately.

SUMMARY

Wrapping nodes in a drawing canvas may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Wrapping nodes in a drawing canvas may be provided. A plurality of nodes may be received and a location to wrap the plurality of nodes may be determined. The location may be between two consecutive nodes in the plurality of nodes. Furthermore, a direction may be determined to place a first subset of the plurality of nodes comprising at least one node in the plurality of nodes and being subsequent to the determined location. The plurality of nodes may be balanced using at least one of the following: i) placing nodes within the plurality of nodes to an end of available space within the drawing canvas; ii) placing a first predetermined number of nodes of the plurality of nodes per row; and iii) evenly spacing a second predetermined number of nodes of the plurality of nodes.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings:

FIG. 11 FIG. 10 shows a drawing canvas where flowDirection=column;

DETAILED DESCRIPTION

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Wrapping (or "snaking") nodes in a drawing canvas may be provided. Consistent with embodiments of the present invention, users may place drawing elements (e.g. nodes) on more than just a single row in a diagram. For example, if a user wants multiple drawing element lines, the user does not need to create multiple instances of a single row graphic and append them together. This may eliminated the conventional process or, if any new elements are added, updating all the different instances in a drawing canvas so they all balance appropriately. Consequently, consistent with embodiments of the invention, nodes may be placed on multiple rows in a diagram on a drawing canvas to maximize space, for example, both horizontally and vertically.

Consistent with embodiments of the invention, diagrams in a drawing canvas that may be modified by user edits or extended creating new diagram definition. Consequently, layouts that result in expected and aesthetically pleasing diagram layouts may be created. For example, diagram element layouts created by embodiments of the present invention may take advantage of a drawing canvas by placing the diagram elements in a snaking pattern. To accomplish this, embodiments of the invention may: i) determine the correct location to wrap nodes; ii) determine how to equally balance the nodes; iii) determine the direction to place subsequent nodes; iv) support nodes of different sizes and re-flows appropriately; and v) offset subsequent rows. Furthermore, embodiments of the invention are not limited to wrapping in the horizontal direction (e.g. rows) and may wrap in any direction including, for example, the vertical direction (e.g. columns).

Figure 1:
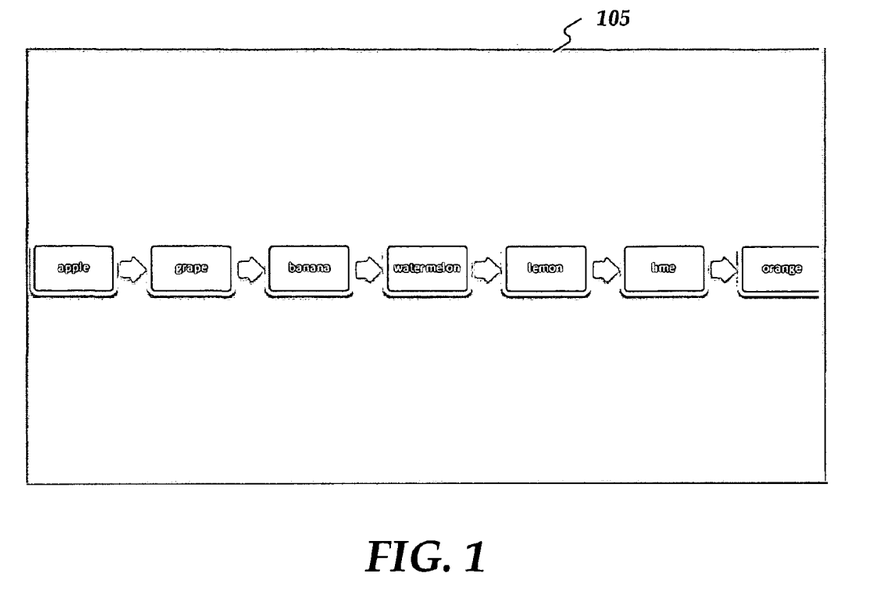
FIG. 1 shows a drawing canvas in which elements are placed on a single line.
Figure 2:
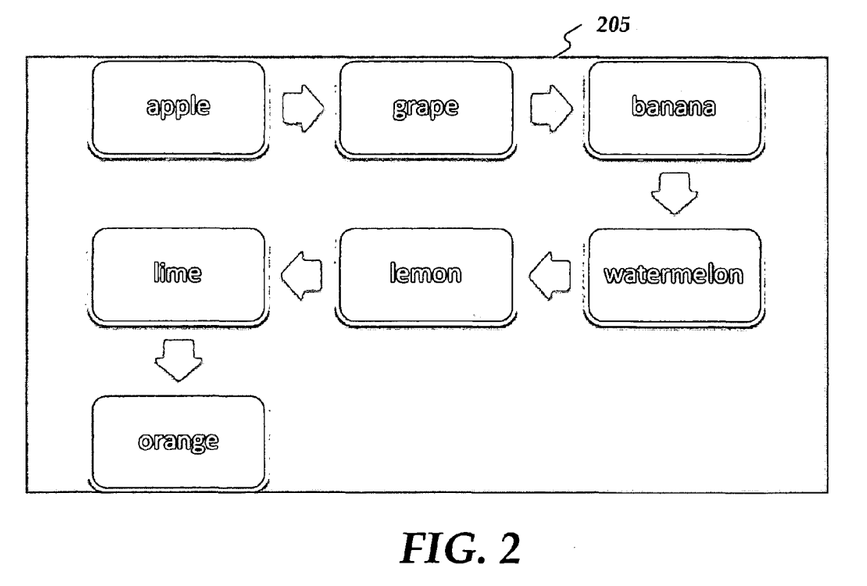
FIG. 2 shows drawing elements wrapped in a drawing canvas.

FIG. 1 shows a drawing canvas 105 in which elements are placed on a single line in a conventional manner. Consistent with embodiments of the invention, as shown in FIG. 2, drawing elements may be wrapped in a drawing canvas 205. This wrapping function can be accomplished, for example, based on inputs sent by a diagram definition author as described in U.S. patent application Ser. No. 10/955,271, filed Sep. 30, 2004, entitled, "Method, System, and Computer-Readable Medium for Creating and Laying Out a Graphic within an Application Program," which is incorporated herein by reference.

Figure 3:
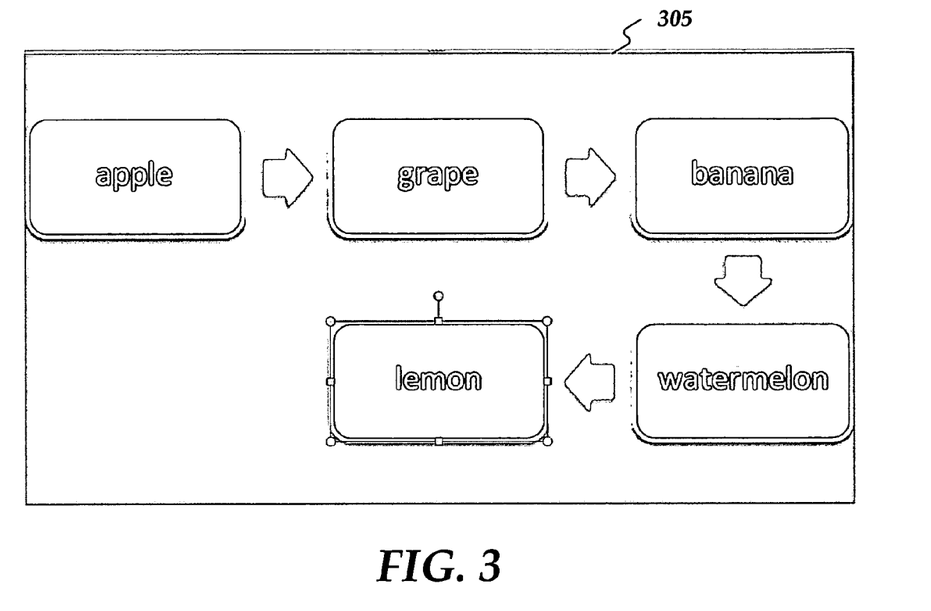
FIG. 3 shows elements placed to an end of the available space in a drawing canvas.
Figure 4:
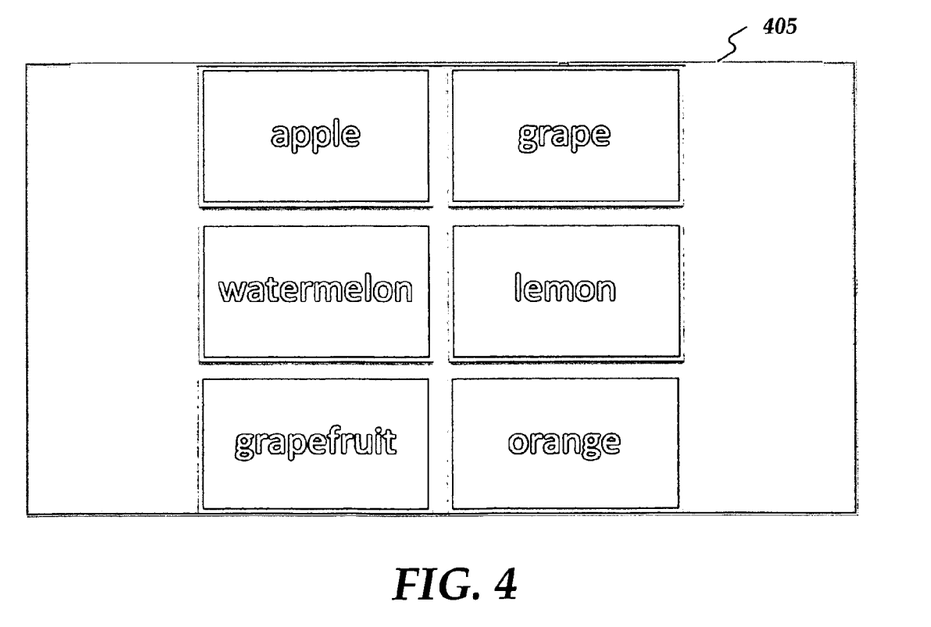
FIG. 4 shows placing a specific number of nodes per row.
Figure 5:
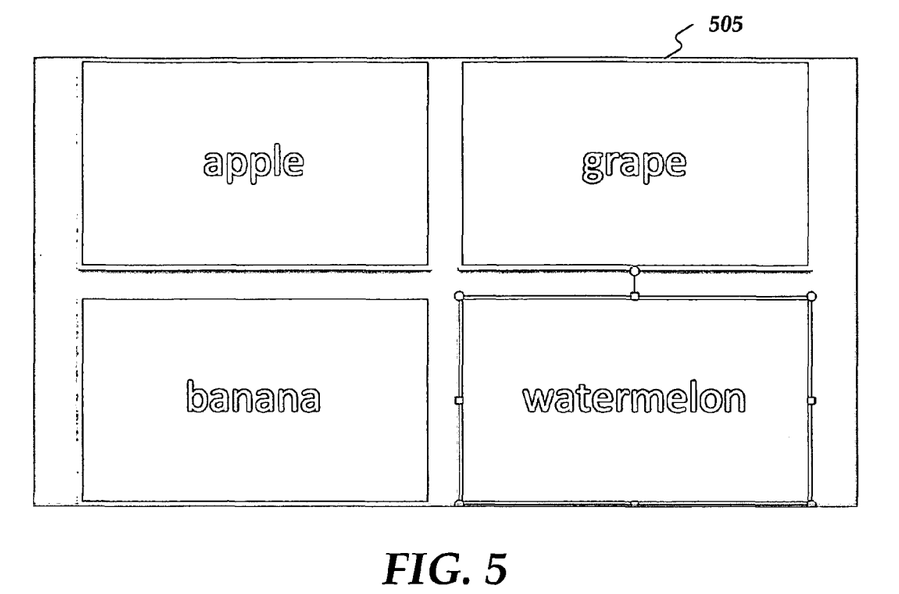
FIG. 5 shows elements balanced on each row in a drawing canvas.

Embodiments of the invention may place elements to the end of any available space within a drawing canvas, place a specific number of nodes per row, or balance elements on each row. As shown in FIG. 3, elements may be placed to an end of the available space in a drawing canvas 305. Furthermore, embodiments of the invention may place a specific number of nodes per row (e.g. two nodes per row) as shown in a drawing canvas 405 shown in FIG. 4. Or elements may be balanced on each row as shown in a drawing canvas 505 as shown in FIG. 5.

Figure 6:
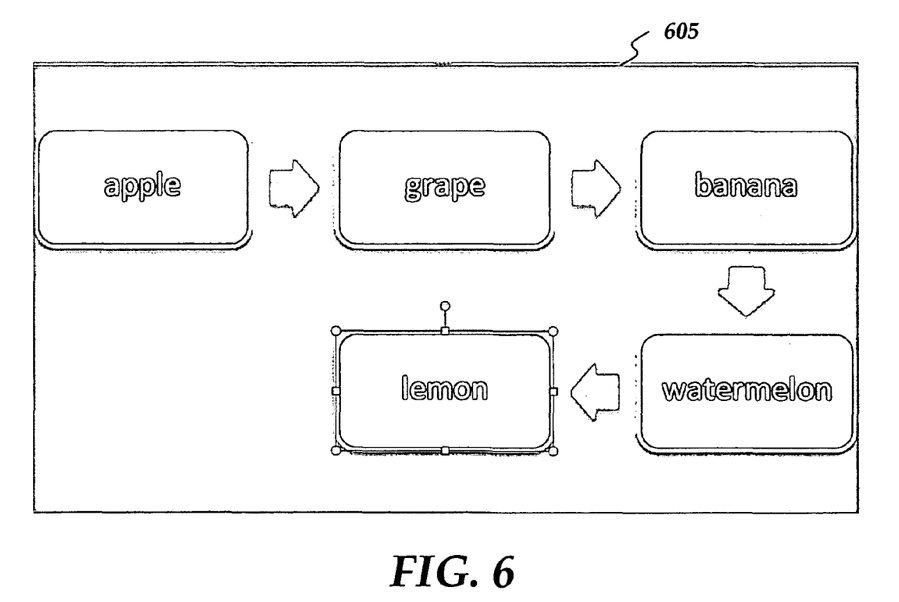
FIG. 6 shows a direction change between rows.

Furthermore, consistent with embodiments of the invention, multiple starting locations and flow directions may be provided as shown in FIG. 6. For example, elements may be placed on any corner of the available space within a drawing canvas 605. The elements may then be placed from that location. In other words, drawing canvas 605 may begin in the top left, have nodes placed from left to right, but may switch direction in each row. For example, each row in drawing canvas 605 may be placed going the same direction (e.g. right to left or left to right) or can switch directions in each row.

Figure 7:
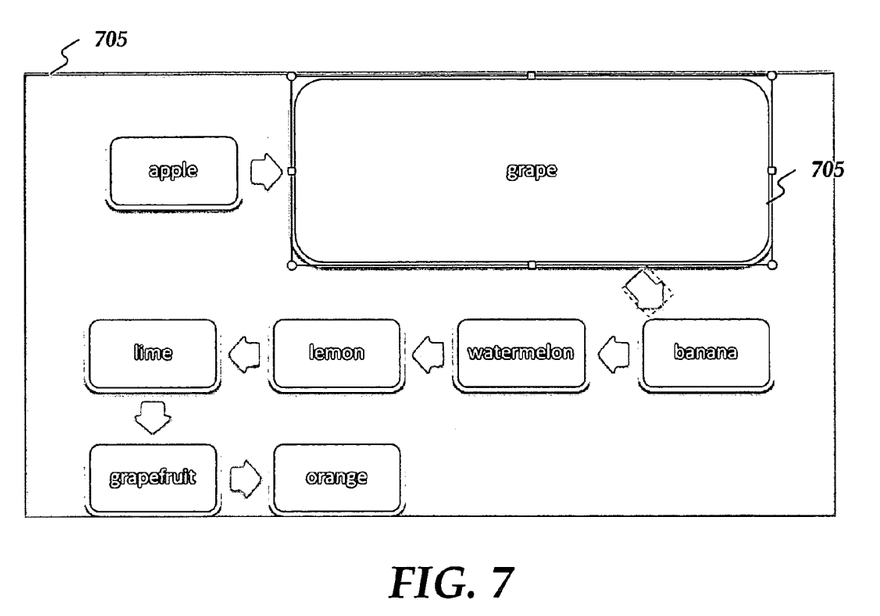
FIG. 7 shows reflowing based on sizes.
Figure 8:
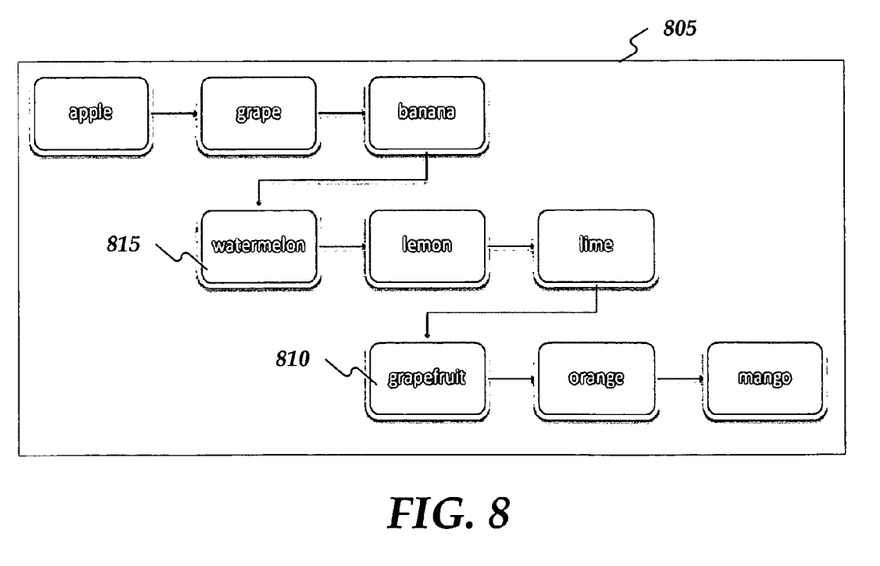
FIG. 8 shows subsequent rows being offset.

FIG. 7 shows reflowing based on sizes. For example, if one of the elements is customized to be larger or just set by a user, the elements within a drawing canvas 705 may be re-flowed appropriately to new rows to make room for a larger element 710. Furthermore, as shown in FIG. 8, subsequent rows may be offset. Embodiments of the invention may also allow rows to be offset or indented from the previous row. For example, as shown in a drawing canvas 805, a grapefruit element 810 may be indented one element width with respect to a watermelon element 815.

Figure 9:
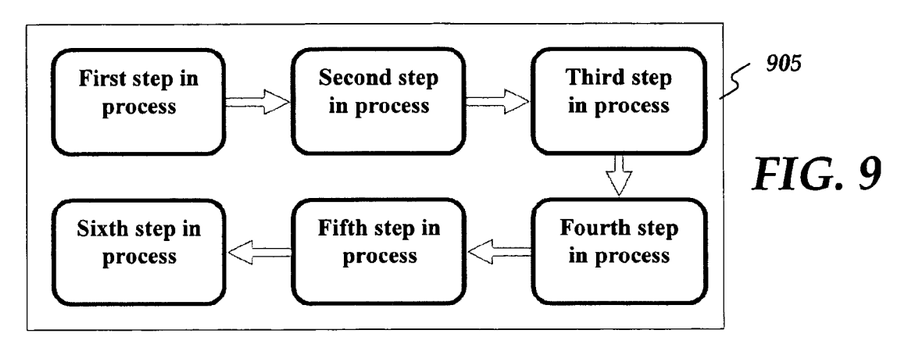
FIG. 9 shows a snaked process diagram example.

Consistent with embodiments of the invention, "snaked" (or wrapped) diagrams may bend when they reach drawing canvas borders or at some other specified point. For example, FIG. 9 shows a snaked process diagram example on a drawing canvas 905. In order to perform the aforementioned snaking (i.e. wrapping) process, a number of parameters may be used. Parameters may comprise values passed to an algorithm that the algorithm cannot change during layout of the drawing elements on a drawing canvas. The parameters may provide values that create the look of a diagram variation. In addition, the parameters may comprise, but are not limited to the parameters listed in Table 1 below that summarizes the algorithm parameters, parameter values, and parameter defaults.

TABLE 1

| Parameter Name | Values | Default |
|---|---|---|
| growDirection | topLeft<br>topRight<br>bottomLeft<br>bottomRight | topLeft |
| flowDirection | row<br>column | Row |
| continueDirection | reverseDirection<br>sameDirection | sameDirection |
| breakpoint | endOfCanvas<br>balanced<br>fixed (if fixed is selected, the algorithm will look to breakpointFixedValue parameter for breakpoint amount). | endOfCanvas |
| breakpointFixedValue | numeric value >= 1 | 2 |
| offset | centered<br>offset (if offset is selected, the algorithm will look to alignmentOffset constraint for amount to offset). | offset |
| nodeVerticalAlignment | top<br>middle<br>bottom | middle |
| nodeHorizontalAlignment | left<br>center<br>right | center |

The parameters listed above are explained in more detail below. With respect to the orientation parameter, snaked diagrams may be laid out with several different orientations, or paths. The primary orientation of the diagram may be analogous to linear process diagram, but a secondary orientation may determine where a first shape after the break point may be placed. A snake path may be specified, for example, with three parameters:

```
<parameter name="growDirection" value="topLeft" />
<parameter name="flowDirection" value="row" />
<parameter name="continueDirection" value="reverseDirection" />
```

The growDirection parameter may specify the direction of growth for a snake. A first node's location may be position in one of the four corners on a drawing area (e.g. drawing canvas). Regardless of which of these parameters are specified, the initial location of the snake may be defined by the alignment parameter. The Top value may specify that subsequent rows/nodes may be placed below the current one. The Bottom value may specify that subsequent rows/nodes may be placed above the current one. The Left value may specify that subsequent nodes/columns may be placed to the right of the current node. In addition, the Right value may specify that subsequent nodes/columns may be placed to the left of the current node. For example, if topLeft is specified and flowDirection is row, each subsequent node on the same row may be placed to the right of the current node. When a new row is added, it may be placed below the current row.

Figure 10:
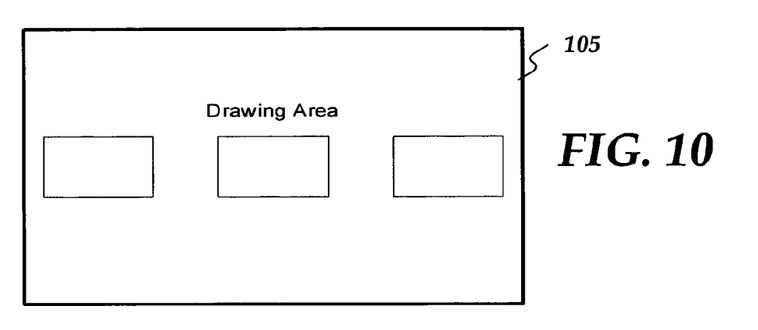
FIG. 10 shows a drawing canvas where flowDirection=row.
Figure 11:
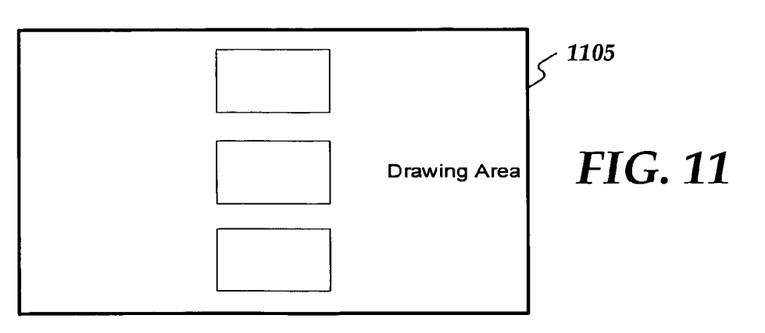

The flowDirection parameter may specify whether to position the nodes to use horizontal (e.g. row) or vertical (e.g. column) space first. If the nodes are in rows, each additional node may be to the right or left (e.g. depending on growDirection) of the previous node. Once a breakpoint is reached, a new row may be created. The same may apply for columns, however, subsequent nodes may be placed either above or below the previous node (e.g. depending on the direction of growth). FIG. 10 shows a drawing canvas 1005 where flowDirection=row. FIG. 11 FIG. 10 shows a drawing canvas 1105 where flowDirection=column.

The continueDirection parameter may specify the direction of the subsequent row or column. For example, if initially the nodes are being placed from left to right, reverseDirection may mean the next row would place the nodes from right to left. However if continueDirection is used, the nodes on the next row may start from the left and go from left to right. Examples of these direction parameters may support the following combinations as summarized in Table 2 below.

TABLE 2

TABLE 2-continued

Moreover, a break point parameter may be used. For example, snake diagrams vary in when they actually reach the break point, the point at which the diagram starts to snake. For example, they may snake to keep an even number of rows and columns, they may snake at a fixed point (e.g. three nodes in the row), or they may snake when there is no more room for a shape in the row. Table 3 below shows an example where four normal nodes fit across a screen.

TABLE 3

Example of the diagram definition XML with respect to the break point parameter follow:

```
<parameter name="breakPoint" value="balanced" />
<parameter name="breakPoint" value="fixed" />
<parameter name="breakPoint" value="endOfCanvas" />
```

When balanced breakpoint is selected, embodiments of the invention may take the square root of the number of nodes, round up, and make that value the number of columns (e.g. if flowDirection is row) or rows (e.g. if flowDirection is column). Consequently, there may only be a balanced looking snake if the square root of the number of nodes is a whole number. Otherwise, the final row or column may have fewer nodes than the others.

When fixed is selected, embodiments of the invention may look to breakpointFixedValue to see how many nodes to fit per row or column. Consequently, the top-level nodes may be look at, composite shapes may count as a single node, and transitions may not get counted.

Snake alignment and offsets parameter may be used. For example, a next row of snaked process nodes can be directly aligned with the preceding row, or can be offset below it. If the alignment uses offset, the alignment offset value may be a constraint (with a default of 0). Table 4 illustrates examples of various offsets and alignments consistent with embodiments of the invention.

TABLE 4

Offset = 0 (fully aligned)

Offset = 1
(node width + transition
width = 1 in this example)

Offset = 0.5 * node width

TABLE 4-continued

Offset = 0.5 * node width, when alternating orientations are used

Centered

Furthermore, in addition to the position of the entire diagram, the alignment of individual nodes may be specified. For example, if all of the nodes in a drawing canvas are the same size, these parameters may do nothing. However, if the nodes are not the same size, these parameters may indicate the sides to which the shapes to line up. For example, left nodeHorizontalAlignment may mean that the left side of all the shapes line up. In other words, two parameters may be used to specify node positioning, for example, nodeHorizontalAlignment and nodeVerticalAlignment. The nodeVerticalAlignment parameter's default may be middle. Options for this parameter may include, but not limited to, top, middle, and bottom. The nodeHorizontalAlignment default may be center. Options for this parameter may include, but not limited to, left, center, or right.

In addition to parameters, embodiments of the invention may use constraints. Constraints may comprise values that may be changed during diagram layout. Constraints may provide values for shape size, space between shapes, equality, and font size. For example, "width" and "height" may be used as constraints for normal node sizing. These may comprise general constraints and may not be specific to a snake algorithm.

As stated above, wrapping (or "snaking") a plurality of nodes into at least two rows in a drawing canvas may be provided. In displaying the at least two rows, embodiments of the invention may initiate an "offset." For example, the plurality of nodes may be broken into a first subset of nodes (e.g. a first row) and a second subset of nodes (e.g. a second row.) In displaying the wrapped plurality of nodes, embodiments of the invention may offset, in the drawing canvas, the first row with respect to second row. In offsetting the two rows, embodiments of the invention may determine how much room to leave, for example, on the right of the first row. For example, embodiments of the invention may calculate how many nodes there are in the plurality of nodes. The amount of space per row may depend on how many rows there are because a "blank" space may be allocated at the right end of the second row to create a "stair step" or offset effect. If there are 6 nodes, for example, then the first row may need to have space for 4 nodes. The second row then places its first node at the x-coordinate of the first row's second node. To implement the aforementioned offset process, embodiments of the invention may use a snake specific constraint such as an alignmentOffset constraint. The alignmentOffset constraint may specify the offset value if the alignment parameter is set to "offset". A default value for this constraint may be 0, which provides for fully-aligned nodes.

Furthermore, embodiments of the invention may provide a set spacing between nodes. For example, embodiments of the invention may use a snake specific spacing constraint. The spacing constraint may specify the amount of space between rows. The default value may be the node height (if the nodes are arranged in rows) and the node width (if the nodes are arranged in columns). If the nodes are not all the same size, the spacing may refer to the smallest distance between the largest nodes.

Figure 12:
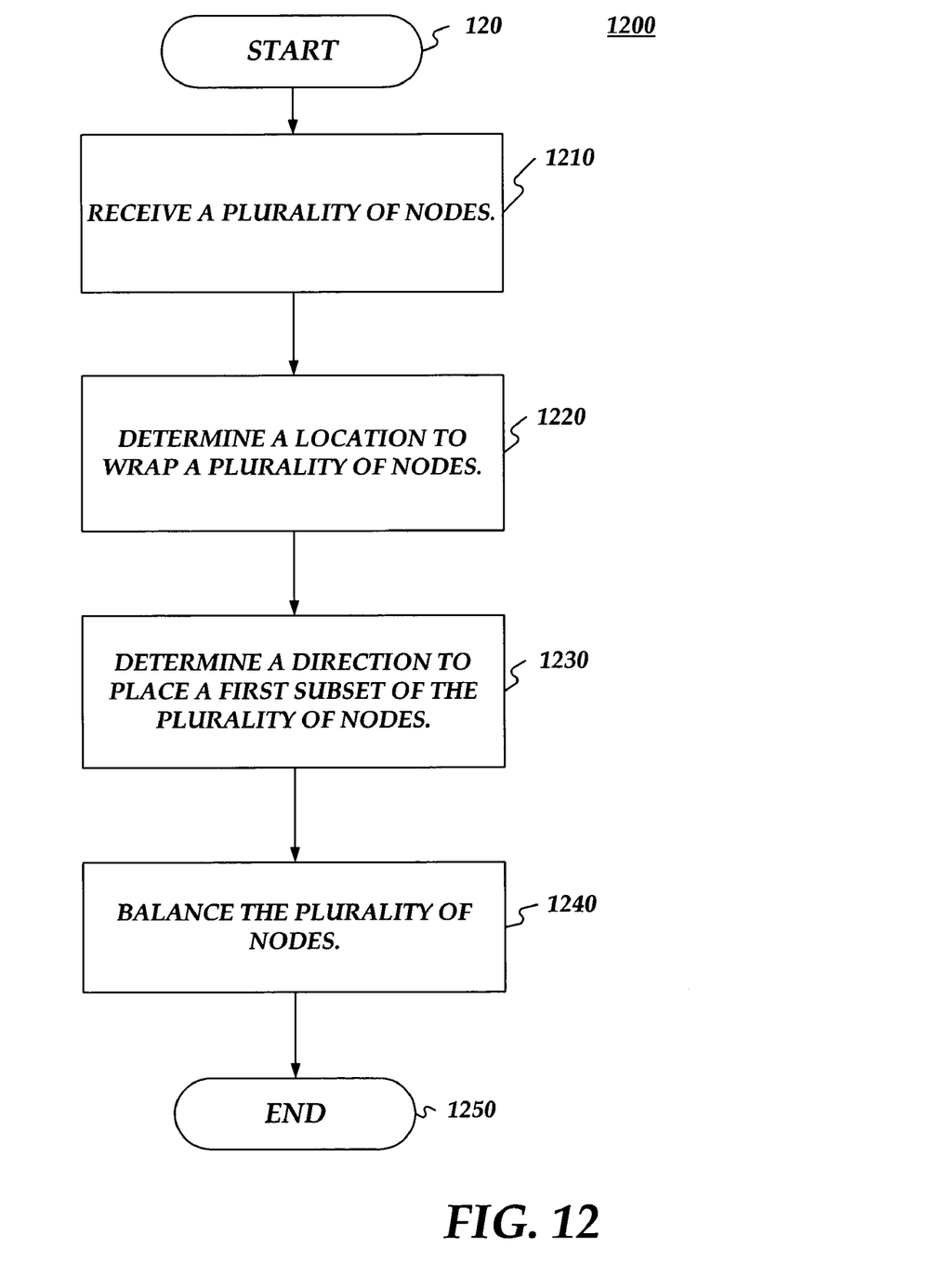
FIG. 12 is a flow chart of a method for wrapping nodes in a drawing canvas.

FIG. 12 is a flow chart setting forth the general stages involved in a method 1200 consistent with an embodiment of the invention for wrapping nodes in a drawing canvas. Method 1200 may be implemented using a computing device 1300 as described in more detail below with respect to FIG. 13. Ways to implement the stages of method 1200 will be described in greater detail below. Method 1200 may begin at starting block 305 and proceed to stage 310 where computing device 1300 may receive a plurality of nodes. For example, a user may input the plurality of nodes through an input device 1312.

From stage 1210, where computing device 1300 receives the plurality of nodes, method 1200 may advance to stage 1220 where computing device 1300 may determine a location to wrap the plurality of nodes. The location may be between two consecutive nodes in the plurality of nodes. For example, embodiments of the invention may place nodes to the end of any available space within a drawing canvas, place a specific number of nodes per row, or balance nodes on each row. As shown in FIG. 3, nodes may be placed to an end of the available space in drawing canvas 305. Furthermore, embodiments of the invention may place a specific number of nodes per row (e.g. two nodes per row) as shown in drawing canvas 405 shown in FIG. 4. Or nodes may be balanced on each row as shown in drawing canvas 505 as shown in FIG. 5.

Once computing device 1300 determines the location to wrap the plurality of nodes in stage 1220, method 1200 may continue to stage 1230 where computing device 1300 may determine a direction to place a first subset of the plurality of nodes. The first subset may comprise at least one node in the plurality of nodes and may be subsequent to the determined location. For example, multiple starting locations and flow directions may be provided as shown in FIG. 6. Nodes may be placed on any corner of the available space within drawing canvas 605. The nodes may then be placed from that location. In other words, drawing canvas 605 may begin in the top left, have nodes placed from left to right, but may switch direction in each row. For example, each row in drawing canvas 605 may be placed going the same direction (e.g. right to left or left to right) or can switch directions in each row.

After computing device 1300 determines the direction to place the first subset of the plurality of nodes in stage 1230, method 1200 may proceed to stage 1240 where computing device 1300 may balance the plurality of nodes. In balancing the plurality of nodes, one of the following may be used: i) placing nodes within the plurality of nodes to an end of available space within a drawing canvas; ii) placing a first predetermined number of nodes of the plurality of nodes per row; and iii) evenly spacing a second predetermined number of nodes of the plurality of nodes. For example, FIG. 7 shows reflowing based on sizes. If one of the elements is customized to be larger or just set by a user, the elements with in drawing canvas 705 may be re-flowed appropriately to new rows to make room for larger element 710. Furthermore, as shown in FIG. 8, subsequent rows may be offset. Embodiments of the invention may also allow rows to be offset or indented from the previous row. For example, as shown in drawing canvas 805, grapefruit element 810 may be indented one element width with respect to watermelon element 815. Once computing device 1300 balance the plurality of nodes in stage 1240, method 1200 may then end at stage 1250.

An embodiment consistent with the invention may comprise a system for wrapping nodes in a drawing canvas. The system may comprise a memory storage and a processing unit coupled to the memory storage. The processing unit may be operative to determine a location to wrap a plurality of nodes, the location being between two consecutive nodes in the plurality of nodes. The processing unit may be further operative to determine a direction to place a first subset of the plurality of nodes comprising at least one node in the plurality of nodes and being subsequent to the determined location. Furthermore, the processing unit may be operative to balance the plurality of nodes comprising at least one of the following: i) placing nodes within the plurality of nodes to an end of available space within the drawing canvas; ii) placing a first predetermined number of nodes of the plurality of nodes per row; and iii) evenly spacing a second predetermined number of nodes of the plurality of nodes.

Another embodiment consistent with the invention may comprise a system for wrapping nodes in a drawing canvas. The system may comprise a memory storage and a processing unit coupled to the memory storage. The processing unit may be operative to receive a plurality of nodes and to wrap the plurality of nodes using at least one constraint. The at least one constraint may comprise values passed to an algorithm that the algorithm can change during wrapping the plurality of nodes. The at least one constraint may provide values that create a diagram variation. Moreover, the processing unit may be operative to render the wrapped plurality of nodes to the drawing canvas.

Yet another embodiment consistent with the invention may comprise a system for wrapping nodes in a drawing canvas. The system may comprise a memory storage and a processing unit coupled to the memory storage. The processing unit may be operative to receive a plurality of nodes. The processing unit may be further operative to wrap the plurality of nodes using at least one parameter. The at least one parameter may comprise values passed to an algorithm that the algorithm cannot change during wrapping the plurality of nodes. The at least one parameter may provide values that create a diagram variation. In addition, the processing unit may be operative to render the wrapped plurality of nodes to the drawing canvas.

Figure 13:
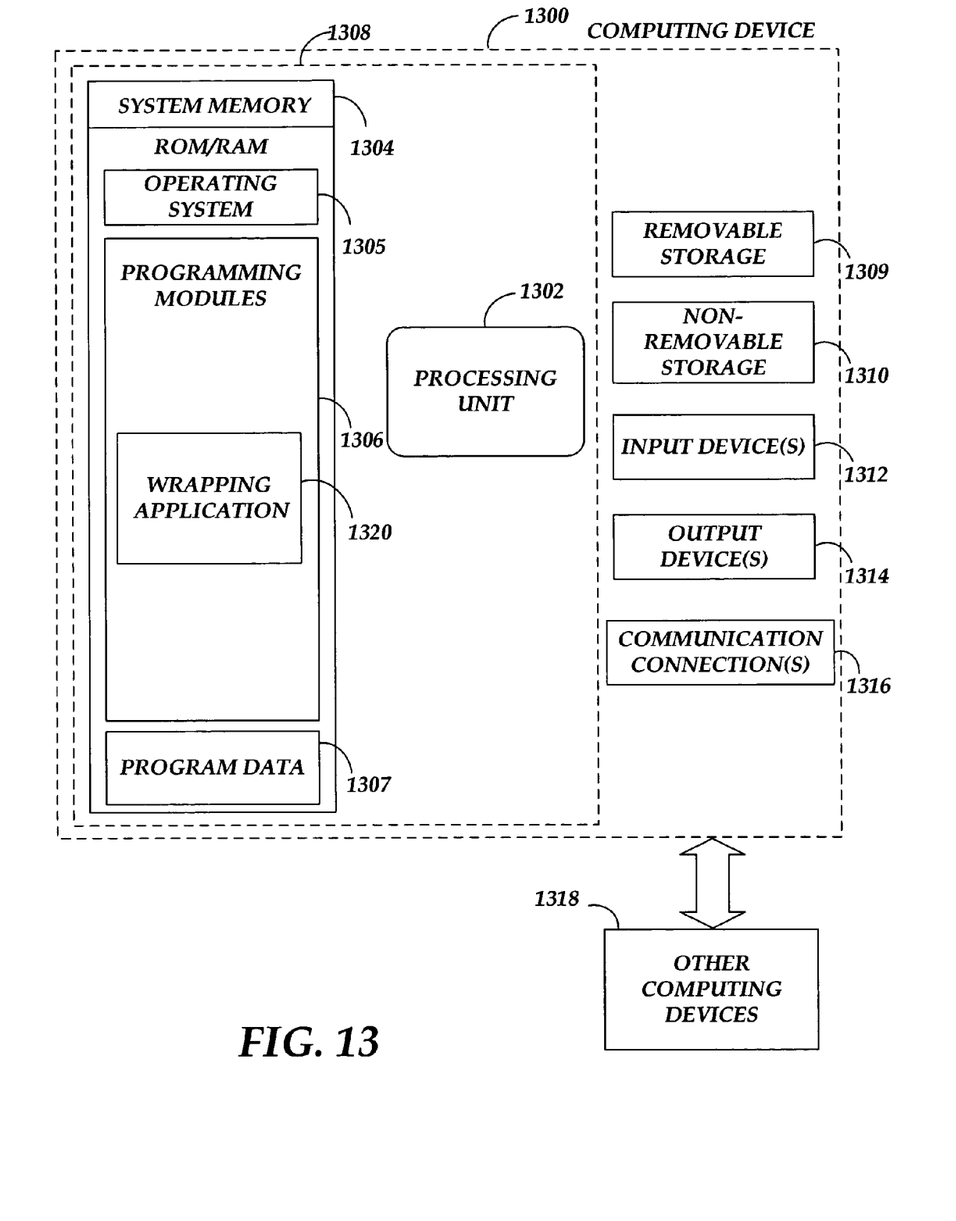
FIG. 13 is a block diagram of a system including a computing device.

FIG. 13 is a block diagram of a system including computing device 1300. Consistent with an embodiment of the invention, the aforementioned memory storage and processing unit may be implemented in a computing device, such as computing device 1300 of FIG. 13. Any suitable combination of hardware, software, or firmware may be used to implement the memory storage and processing unit. For example, the memory storage and processing unit may be implemented with computing device 1300 or any of other computing devices 1318, in combination with computing device 1300. The aforementioned system, device, and processors are examples and other systems, devices, and processors may comprise the aforementioned memory storage and processing unit, consistent with embodiments of the invention.

With reference to FIG. 13, a system consistent with an embodiment of the invention may include a computing device, such as computing device 1300. In a basic configuration, computing device 1300 may include at least one processing unit 1302 and a system memory 1304. Depending on the configuration and type of computing device, system memory 1304 may comprise, but is not limited to, volatile (e.g. random access memory (RAM)), non-volatile (e.g. read-only memory (ROM)), flash memory, or any combination. System memory 1304 may include operating system 1305, one or more programming modules 1306, and may include a program data file 1307. Operating system 1305, for example, may be suitable for controlling computing device 1300's operation. In one embodiment, programming modules 1306 may include, for example wrapping module 1320. Furthermore, embodiments of the invention may be practiced in conjunction with a graphics library, other operating systems, or any other application program and is not limited to any particular application or system. This basic configuration is illustrated in FIG. 13 by those components within a dashed line 1308.

Computing device 1300 may have additional features or functionality. For example, computing device 1300 may also include additional data storage devices (removable and/or non-removable) such as, for example, magnetic disks, optical disks, or tape. Such additional storage is illustrated in FIG. 13 by a removable storage 1309 and a non-removable storage 1310. Computer storage media may include volatile and non-volatile, removable and non-removable media implemented in any method or technology for storage of information, such as computer readable instructions, data structures, program modules, or other data. System memory 1304, removable storage 1309, and non-removable storage 1310 are all computer storage media examples (i.e. memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1300. Any such computer storage media may be part of device 1300. Computing device 1300 may also have input device(s) 1312 such as a keyboard, a mouse, a pen, a sound input device, a touch input device, etc. Output device(s) 1314 such as a display, speakers, a printer, etc. may also be included. The aforementioned devices are examples and others may be used.

Computing device 1300 may also contain a communication connection 1316 that may allow device 1300 to communicate with other computing devices 1318, such as over a network in a distributed computing environment, for example, an intranet or the Internet. Communication connection 1316 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1304, including operating system 1305. While executing on processing unit 1302, programming modules 1306 (e.g. wrapping application 1320) may perform processes including, for example, one or more method 1200's stages as described above. The aforementioned process is an example, and processing unit 1302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A system for wrapping nodes in a drawing canvas, the system comprising:
a memory storage; and
a processing unit coupled to the memory storage, wherein the processing unit is operative to:
receive a plurality of nodes, the plurality of nodes comprising a diagram;
wrap the plurality of nodes using at least one value passed to an algorithm, the algorithm being operative to change the at least one value during wrapping the plurality of nodes, the at least one value being configured to create a diagram variation wherein the processing unit being operative to wrap the plurality of nodes comprises the processing unit being operative to;
take a square root of a number of nodes in the plurality of nodes,
round up the square root of the number of nodes in the plurality of nodes, and
make the rounded-up square root of the number of nodes in the plurality of nodes one of the following: a number of rows used in rendering the wrapped plurality of nodes to the drawing canvas and a number of columns used in rendering the wrapped plurality of nodes to the drawing canvas; and
render the wrapped plurality of nodes to the drawing canvas.

2. The system of claim 1, wherein the processing unit being operative to wrap the plurality of nodes using the at least one value comprises the processing unit being operative to wrap the plurality of nodes using the at least one value configured to specify a spacing between at least two nodes within the plurality of nodes.

3. The system of claim 1, wherein the processing unit being operative to wrap the plurality of nodes using the at least one value comprises the processing unit being operative to wrap the plurality of nodes using the at least one value configured to specify a spacing between at least two nodes within the plurality of nodes comprising one of the following: a width of a node within the plurality of nodes, a height of the node within the plurality of nodes, and a smallest distance between a first largest node within the plurality of nodes and a second largest node within the plurality of nodes.

4. A computer-readable device which stores a set of instructions which when executed performs a method for wrapping nodes in a drawing canvas, the method executed by the set of instructions comprising:
 receiving a plurality of nodes comprising a diagram;
 wrapping the plurality of nodes using at least one value passed to an algorithm, the algorithm being configured so as not to change the at least one value during wrapping the plurality of nodes wherein wrapping the plurality of nodes using the at least one value comprises wrapping the plurality of nodes using the at least one value comprising;
  taking a square root of a number of nodes in the plurality of nodes,
  rounding up the square root of the number of nodes in the plurality of nodes, and
  making the rounded-up square root of the number of nodes in the plurality of nodes one of the following: a number of rows used in rendering the wrapped plurality of nodes to the drawing canvas and a number of columns used in rendering the wrapped plurality of nodes to the drawing canvas; and
 rendering the wrapped plurality of nodes to the drawing canvas.

5. A computer-readable device of claim 4, wherein wrapping the plurality of nodes using the at least one value comprises wrapping the plurality of nodes using the at least one value configured to specify a direction to grow a snake from a point in the drawing canvas where the snake started.

6. A computer-readable device of claim 4, wherein wrapping the plurality of nodes using the at least one value comprises wrapping the plurality of nodes using the at least one value configured to specify whether to position the plurality of nodes to first use one of the following: horizontal space and vertical space.

7. A computer-readable device of claim 4, wherein wrapping the plurality of nodes using the at least one value comprises wrapping the plurality of nodes using the at least one value configured to specify whether to specify a direction of a subsequent one of the following: a row and a column.

8. A computer-readable device of claim 4, wherein wrapping the plurality of nodes using the at least one value comprises wrapping the plurality of nodes using the at least one value configured to specify one of the following: changing a wrapping direction of a subsequent row and keeping the wrapping direction the same for the subsequent row.

9. A computer-readable device of claim 4, wherein wrapping the plurality of nodes using the at least one value comprises wrapping the plurality of nodes using the at least one value configured to specify one of the following: changing a wrapping direction of a subsequent column and keeping the wrapping direction the same for the subsequent column.

10. A computer-readable device of claim 4, wherein wrapping the plurality of nodes using the at least one value comprises wrapping the plurality of nodes using the at least one value configured to set a predetermined number of nodes within the plurality of node per one of the following: a row and a column.

11. A computer-readable device of claim 4, wherein wrapping the plurality of nodes using the at least one value comprises wrapping the plurality of nodes using the at least one value configured to cause an offset in at least one of a subsequent one of the following: a row and a column.

12. A computer-readable device of claim 4, wherein wrapping the plurality of nodes using the at least one value comprises wrapping the plurality of nodes using the at least one value configured to configured to specify the horizontal alignment of at least one of the plurality of nodes.

13. A computer-readable device of claim 4, wherein wrapping the plurality of nodes using the at least one value comprises wrapping the plurality of nodes using the at least one value configured to configured to specify the vertical alignment of at least one of the plurality of nodes.

14. A computer-readable device of claim 4, further comprising:
 receiving an additional node;
 adding the additional node to the plurality of nodes;
 wrapping the plurality of nodes using at the least one value passed to the algorithm, the algorithm being configured so as not to change the at least one value during wrapping the plurality of nodes; and
 rendering the wrapped plurality of nodes to the drawing canvas.

15. A method for wrapping nodes in a drawing canvas, the method comprising:
 receiving a plurality of nodes comprising a diagram;
 wrapping the plurality of nodes using at least one value passed to an algorithm, the algorithm being configured so as not to change the at least one value during wrapping the plurality of nodes wherein wrapping the plurality of nodes using the at least one value comprises wrapping the plurality of nodes using the at least one value comprising;
  taking a square root of a number of nodes in the plurality of nodes,
  rounding up the square root of the number of nodes in the plurality of nodes, and
  making the rounded-up square root of the number of nodes in the plurality of nodes one of the following: a number of rows used in rendering the wrapped plurality of nodes to the drawing canvas and a number of columns used in rendering the wrapped plurality of nodes to the drawing canvas; and
 rendering the wrapped plurality of nodes to the drawing canvas.

16. The method of claim 15, wherein wrapping the plurality of nodes using the at least one value comprises wrapping the plurality of nodes using the at least one value configured to specify a direction to grow a snake from a point in the drawing canvas where the snake started.

17. The method of claim 15, wherein wrapping the plurality of nodes using the at least one value comprises wrapping the plurality of nodes using the at least one value configured to specify whether to position the plurality of nodes to first use one of the following: horizontal space and vertical space.

18. The method of claim 15, wherein wrapping the plurality of nodes using the at least one value comprises wrapping the plurality of nodes using the at least one value configured to specify whether to specify a direction of a subsequent one of the following: a row and a column.

19. The method of claim 15, wherein wrapping the plurality of nodes using the at least one value comprises wrapping the plurality of nodes using the at least one value configured to specify one of the following: changing a wrapping direction of a subsequent row and keeping the wrapping direction the same for the subsequent row.

20. The method of claim 15, wherein wrapping the plurality of nodes using the at least one value comprises wrapping the plurality of nodes using the at least one value configured to specify one of the following: changing a wrapping direction of a subsequent column and keeping the wrapping direction the same for the subsequent column.

* * * * *